United States Patent Office 3,538,142
Patented Nov. 3, 1970

---

3,538,142
PROCESS OF ISOMERIZING 3-PENTENENITRILE TO 4-PENTENENITRILE
William C. Drinkard, Jr., Wilmington, and Richard V. Lindsey, Jr., Hockessin, Del., assignors to E. I. du Pont de Nemours and Company, Wilmington, Del., a corporation of Delaware
No Drawing. Continuation-in-part of application Ser. No. 682,623, Nov. 13, 1967. This application Aug. 4, 1969, Ser. No. 847,442
Int. Cl. C07c 121/30
U.S. Cl. 260—465.9                      5 Claims

ABSTRACT OF THE DISCLOSURE

Hydrides of nickel coordination compounds of the general formula $HNi(MYZ)_n{}^+X^-$ where M is P, As or Sb, Z is R or OR, where R is a hydrocarbyl radical of up to 18 carbon atoms or a hydrcarbyl radical of up to 18 carbon atoms substituted with any of —Cl, —O— or —CN, where Y is two Z's or either —R'— or —O—R'—O—, where —R'— is a divalent hydrocarbylene radical of from 2 to 12 carbon atoms, $n$ is 3 or 4, and $X^-$ is an anion of a protonic acid, particularly $HSO_4{}^-$, $Cl^-$, $Br^-$, $CN^-$, $CF_3COO^-$, $AlCl_4{}^-$, or $ZnCl_2CN^-$ or $BF_4{}^-$ and the process of preparing these hydrides from the corresponding nickel complex and acid as well as the process of isomerizing 3-pentenenitrile to 4-pentenenitrile using the hydrides.

CROSS-REFERENCE TO RELATED APPLICATION

This application is a continuation-in-part of U.S. patent application Ser. No. 682,623 filed Nov. 13, 1967, by Wililam C. Drinkard, Jr. and Richard V. Lindsey, Jr., now abandoned.

BACKGROUND OF THE INVENTION

Nickel coordination complexes derived from nickel tetracarbonyl by the replacement of all four carbonyls with an arsine, arsenite, stibite, stibine, phosphite or phosphine are disclosed in U.S. Pat. No. 3,328,443, issued June 27, 1967 to Reginal F. Clark, et al. These complexes are further disclosed as being useful in the dimerization, trimerization and polymerization of butadiene.

The present invention relates to hydrides of nickel coordination compounds having the general formula $HNi(MYZ)_nX$ wherein M is selected from the class consisting of P, As and Sb, wherein Z is selected from the class consisting of R and OR wherein R is selected from the class consisting of hydrocarbyl radicals of up to 18 carbon atoms and hydrocarbyl radicals of up to 18 carbon atoms substituted with groups selected from the class consisting of —Cl, —O—, and —CN, wherein Y is selected from the class consisting of two Z's and groups of the formula —R'— and —O—R'—O—wherein —R'— is a divalent hydrocarbylene radical of from 2 to 12 carbon atoms, wherein $n$ is an integer of from 3 to 4, and X is the anion of an acid. The various R's in a given compound may be the same or different. These compounds are generally prepared in solution by treating a compound of the formula $Ni(MYZ)_4$ wherein M, Y, and Z have the meanings defined above, with an acid of the general formula HX to attach a proton directly to nickel to give a compound of the formula $HNi(MYZ)_n{}^+X^-$.

Suitable anions for use as $X^-$ generally include the anionic portion of a protonic acid, such as $HSO_4{}^-$, $Cl^-$, $CF_3COO^-$, $AlCl_4{}^-$, $Br^-$, $CN^-$, $ZnCl_2CN^-$ or $BF_4{}^-$. The acid may have sufficient inherent strength in the parent acid to form the hydride, or the acid strength of weak acids may be enhanced by the addition of Lewis acids.

The solvent is not critical and any liquid capable of dissolving the nickel complex starting material may be used. Generally, organic solvents such as benzene, toluene, p-xylene, acetone, 3-pentenenitrile, chloroform, nitrobenzene, ether, methyl ethyl ketone adiponitrile, 2-methyl-3-butenenitrile, dioxane, triphenyl phosphite, tritolyl phosphite, or tetrahydrofuran may be used.

The nickel complex being used and the acid being used are generally reacted from —50 to 150° C. to form the hydrides. The reaction time is not critical and the reaction appears to begin immediately on contact of the acid and the nickel complex with completion of hydride formation generally ocurring within about five minutes. The solvent can readily be removed by applying a vacuum to the solution. The hydrides of the present invention are not particularly thermally stable and therefore the solvent generaly should be removed by applying the vacuum at a temperature below 25° C. and preferably below —10° C. The amount of vacuum applied is not particularly critical and may be any pressure of from about 1 micron of mercury up to the vapor pressure of the solvent being used at the temperature being used. Generally, a pressure of less than ½ atm. is preferred.

The hydrides of the present invention are best identified by nuclear magnetic resonance according to the principles explained on pages 127–135 of "Advances in Inorganic Chemistry and Radiochemistry", volume 7, by H. J. Emeleus and A. G. Sharpe published by Academic Press, New York and London, (1965). Perhaps the best indication of the Ni-H bond is the resonance in the area of 12–45$\tau$ and particularly 20–30$\tau$ as set forth on page 127 of this work.

The hydrides of the present invention are useful as catalysts in the isomerization of olefins such as isomerizing 3-pentenenitrile to 4-pentenenitrile, and in the hydrocyanation of organic compounds having ethylenic carbon-carbon unsaturation. This isomerization of olefins generally can be carried out at from —50 to 200° C. and preferably at from 0° C. to 120° C. in the liquid phase. If desired, an inert diluent may also be employed but its use is not preferred generally.

DESCRIPTION OF THE PREFERRED EMBODIMENTS

Example I

This example is carried out in a dry box under a nitrogen gas blanket using diethyl ether solvent and 3-pentenenitrile which have been deoxygenated by bubbling nitrogen gas therethrough under a nitrogen atmosphere.

A round bottom, 25 ml. glass flask equipped with a gas outlet for solvent stripping gas purge and a Teflon® covered magnetic stirring bar is charged with 5 ml. of diethyl ether into which is dissolved 0.73 g. (1 mmole) of $Ni[P(OC_2H_5)_3]_4$. The solution is cooled to about —50° C. by partially immersing the flask in an acetone bath cooled with dry ice. An ether solution of 0.10 g. (1 mmole) concentrated sulfuric acid in 5 ml. of diethyl ether at about —50° C. is added to the solution in the flask. A cloudy yellow solution then forms in the flask. The diethyl ether is removed into a liquid nitrogen cooled trap under a pressure of $10^{-3}$ atm. while rapidly stirring while rapidly stirring and allowing the acetone bath to gradually warm to —20° C. The final solvent-free hydride product, 0.83 g., is a waxy yellow solid at —20° C.

The product prepared above is allowed to remain in the flask and 8.14 g. (100 mmoles) of 3-pentenenitrile free of 4-pentenenitrile cooled to —10° C. is added to the flask. The acetone bath now is maintained at —30° C. The hydride dissolves completely to give a bright yellow solution. The solution is allowed to warm gradually over a period of 45 minutes at which time a temperature of 25° C. is reached. As the solution warms, the color gradually turns to a deep reddish orange.

Gas chromatographic analysis indicates that the flask contains cis and trans 3-pentenenitrile and 4-pentenenitrile, with no appreciable amounts of the conjugated 2-pentenenitrile.

The similarly prepared hydride is characterized in other preparations. Most important, the proton NMR (nuclear magnetic resonance) spectrum of the solvent-free hydride redissolved in dichloromethane shows a symmetrical quintet at 19.5 p.p.m. to high field of solvent dichloromethane $(24.1\tau)J_{PH}=25$ c.p.s. (cycles per second). The infrared spectra of the dichloromethane solution and of the neat compound pressed between sodium chloride plates show a band at 1970 cm.$^{-1}$ attributed to the nickel hydrogen stretching vibration. The assignment is confirmed by preparing the corresponding deuteride from $D_2SO_4$ and finding a major reduction in the intensity of the 1970 cm.$^{-1}$ band. This indicates the presence of the compound $HNi[P(OC_2H_5)_3]_4HSO_4$.

The hydride is a yellow waxy oil at room temperature which darkens gradually on standing even under a blanket of nitrogen gas. It turns green within minutes on exposure to air. It is soluble in dichloromethane and methanol but insoluble in diethyl ether or petroleum ether. The solubility properties of the hydride are consistent with an ionic organometallic compound. In constrast the starting $Ni[P(OC_2H_5)_3]_4$ is quite soluble in all four solvents mentioned.

Example II

A solution containing 0.515 g. of $Ni[P(OC_2H_5)_3]_4$ in 0.5 ml. of benzene is prepared in a 5 ml. glass vial in a nitrogen atmosphere at ambient temperature. The solution is transferred to a sealed NMR tube equipped with a serum cap and 110 microliters of pure $CF_3CO_2H$ is added. A modified HA–100 Varian NMR spectrometer is used to scan the proton region from the 20 to 30 p.p.m. region. A quintet centered at $24.47\tau$ with a splitting coupling constant of $J=27$ c.p.s. is observed. Such a multiplet requires that the hydride hydrogen be split by four equivalent phosphorus groups. This indicates the presence of the compound $HNi[P(OC_2H_5)_3]_4CF_3CO_2$.

Example III

A solution of 0.514 g. of $Ni[P(OC_2H_5)_3]_4$ in 0.50 ml. of benzene is prepared in a 5 ml. glass vial in a nitrogen gas atmosphere at ambient temperature. The solution is transferred to a sealed NMR tube equipped with a serum cap. Fifty-six microliters of liquid hydrogen cyanide are added and the solution analyzed using a modified HA–100 Varian NMR spectrometer. A quartet centered at $26.87\tau$ with a splitting constant of 29 c.p.s. is observed. Such a multiplet requires that the hydride hydrogen be split by three equivalent phosphorus atoms. Thus the hydride has the formula $HNi[P(OC_2H_5)_3]_3CN$.

Example IV

A solution containing 0.516 g. of $Ni[P(OC_2H_5)_3]_4$, 0.097 g. of $ZnCl_2$, 50 microliters of benzene (for NMR reference) and 0.50 ml. of tetrahydrofuran is prepared in a 5 ml. glass vial in a nitrogen gas atmosphere at ambient temperature. The solution is transferred to a sealed NMR tube equipped with a serum cap. Fifty microliters of liquid hydrogen cyanide is then added to the solution.

A modified HA–100 Varian NMR spectrometer is used to analyze the solution. Two multiplets are observed. One is a quintet centered at $24.27\tau$ with a splitting constant $J=29$ c.p.s. The other is a quartet centered at $26.32\tau$ with a splitting constant $J=29$ c.p.s. The quintet is at the same position as the quintet found for the hydride of Example II. The quartet is at the same position as the quartet found for $HNi[P(OC_2H_5)_3]_3CH$ (Example III). This example illustrates that a Lewis acid $(ZnCl_2)$ increases the strength of the HCN to aid in the formation of $HNi[P(OC_2H_5)_3]_3CN$ hydride.

Example V

A solution containing 0.516 g. of $Ni[P(OC_2H_5)_3]_4$, 0.097 g. of $ZnCl_2$, 50 microliters of benzene (for NMR reference), and 0.50 ml. of tetrahydrofuran is prepared in a 5 ml. glass vial in a nitrogen atmosphere. The solution is transferred to a sealed NMR tube equipped with a serum cap and 50 microliters of liquid hydrogen cyanide is added. An IR (infrared) cell is filled with this solution, using a syringe. Using a reference cell containing tetrahydrofuran an IR spectrum is obtained with a Perkin-Elmer Infrared Spectrometer. Peaks are found in the CN stretching region at 2085 cm.$^{-1}$, 2100 cm.$^{-1}$, 2130 cm.$^{-1}$, and 2250 cm.$^{-1}$. The latter three peaks result from CN in different environments to be expected from the following nickel hydride species.

(A)   $HNi[P(OC_2H_5)_3]_3CN$ (B)   $HNi[P(OC_2H_5)_3]_4^+CNZnCl_2^-$

Example VI

A solution containing 0.58 g. of

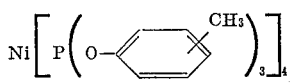

0.06 g. of $ZnCl_2$ and 0.50 g. of tetrahydrofuran is prepared in a 5 ml. glass vial in a nitrogen atmosphere at ambient temperature. The solution is transferred to a sealed NMR tube equipped with a serum cap. Thirty microliters of liquid hydrogen cyanide are then added by means of a syringe to the solution. The solution is then analyzed using a modified HA–100 Varian NMR Spectrometer. A quartet centered at $25.4\tau$ with splitting constant $J=30$ c.p.s. is observed. This multiplet requires that the hydride hydrogen be split by three equivalent phosphorus groups as in

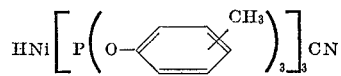

Example VII

A solution containing 0.34 g. of $Ni[P(OC_2H_5)_3]_4$ and 0.5 ml. of benzene is prepared in a 5 ml. glass vial sealed with a serum cap under a nitrogen atmosphere at ambient temperature. Nineteen microliters of liquid hydrogen cyanide are added to the solution after which an infrared cell is filled with the solution by means of a syringe. Using a reference cell containing benzene, an IR spectrum is recorded with a Perkin-Elmer Infrared Spectrometer. In the CN stretching region peaks are observed at 2085 cm.$^{-1}$ (unassociated HCN) and 2130 cm.$^{-1}$. The latter peak results from CN in a different environment as to be expected in the compound $HNi[P(OC_2H_5)_3]_3CN$.

Example VIII

A solution containing 0.302 g. of

0.033 g. of $ZnCl_2$, and 0.5 ml. of tetrahydrofuran is prepared in a 5 ml. glass vial in a nitrogen atmosphere at ambient temperature. The solution is transferred to an NMR tube equipped with a serum cap, and 30 microliters of liquid hydrogen cyanide are added. The solution is analyzed using a modified HA–100 Varian spectrometer. A quartet centered at $25.5\tau$ with coupling constant $J=30$ c.p.s. is observed. This multiplet requires that the hydride hydrogen be split by three equivalent phosphorus groups as in

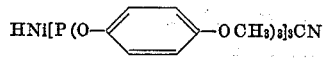

Example IX

In a nitrogen atmosphere a solution is prepared in an NMR tube by dissolving 0.16 g. Ni[PC$_6$H$_5$(OC$_2$H$_5$)$_2$]$_4$ in CDCl$_3$ to a total volume of 0.5 ml. Tetramethylsilane is added as an internal reference. The tube is capped and chilled to −78° C. in a "Dry Ice"/"Triclene" bath. Twelve microliters of concentrated sulfuric acid are added to the tube by means of a syringe. The solution is shaken and a proton NMR spectrum run at 0° C. A sharp hydride quintet resonance at 23.4$\tau$ (J$_{PH}$=22.5 c.p.s.) indicates the presence of HNi[PC$_6$H$_5$(OC$_2$H$_5$)$_2$]$_4$HSO$_4$.

Example X

In a nitrogen atmosphere a solution is prepared in an NMR tube by dissolving 0.85 g. Ni[PC$_6$H$_5$(OC$_2$H$_5$)$_2$]$_4$ in CH$_2$Cl$_2$ to a total volume of 0.5 ml. With the addition of 160 microliters of HCN the color of the solution turns brown and the $^{31}$P NMR spectrum contains a new resonance, doublet, at −39.0 p.p.m. from P$_4$O$_6$(J$_{PH}$=30 c.p.s.), assigned to the phosphorus resonance in HNi[PC$_6$H$_5$(OC$_2$H$_5$)$_2$]$_3$CN The proton NMR spectrum of the same solution showed the expected hydride quartet at 26.4 (J$_{PH}$=33 c.p.s.). The infrared spectrum of the same solution showed the presence of an absorption of 2113 cm.$^{-1}$ due to —CN in HNi[PC$_6$H$_5$(OC$_2$H$_5$)$_2$]$_3$CN.

Example XI

In a nitrogen atmosphere a solution is prepared in an NMR tube by dissolving Ni[P(OCH$_2$CH$_2$Cl)$_3$]$_4$ in CDCl$_3$ to a total volume of 0.5 ml. Tetramethylsilane is used as an internal reference. The tube is capped and chilled to −78° C. in Dry Ice. Ten microliters of concentrated sulfuric acid is added to the tube. On shaking, a bright yellow oil separates. The CDCl$_3$ is removed with a vacuum pump and CH$_2$Cl$_2$ added to give a homogeneous solution. A hydride quintet at 23.97 (J$_{PH}$=28 c.p.s.) indicates the presence of HNi[P(OCH$_2$CH$_2$Cl)$_3$]$_4$HSO$_4$.

In Examples XII to XIV all procedures are conducted either in an evacuated system or in an inert atmosphere. Solvents are dried on Linde molecular sieves except for tetrahydrofuran which is distilled from LiAlH$_4$. The [(C$_6$H$_5$)$_2$PCH$_2$CH$_2$P(C$_6$H$_5$)$_2$]$_2$Ni is prepared by reduction of [(C$_6$H$_5$)$_2$PCH$_2$CH$_2$P(C$_6$H$_5$)$_2$]$_2$NiBr$_2$ with NaBH$_4$. Tetramethylsilane is used as an internal reference in recording the proton NMR spectra.

Example XII

A 500 ml. round-bottom flask is charged with 5.0 g. (5.9 mmoles) of [(C$_6$H$_5$)$_2$PCH$_2$CH$_2$P(C$_6$H$_5$)$_2$]$_2$Ni, and 150 ml. toluene. Upon addition of 0.8 g. (6.0 mmoles) of sublimed AlCl$_3$, a dark brown oil forms. The mixture is degassed and 6.0 mmoles of anhydrous HCl is condensed into the flask. The mixture is then stirrde at 25° C. for 20 hours during which time an orange precipitate has formed. The precipitate is collected and extracted with 90 ml. of tetrahydrofuran and 90 ml. of toluene is added to the orange-red filtered extract. The solution is kept at −25° C. for 18 hours after which the orange prisms which have formed are collected, washed with toluene and dried at 25° C. under 0.1 micron Hg pressure for 2 hours to give 3.9 g. (65%) of

[(C$_6$H$_5$)$_2$PCH$_2$CH$_2$P(C$_6$H$_5$)$_2$]$_2$NiH(AlCl$_4$)

M.P. 198–203° C.

*Analysis.*—Calculated for C$_{52}$H$_{49}$AlCl$_4$NiP$_4$ (percent): C, 61.0; H, 4.8; Al, 2.6; Cl, 13.8; Ni, 5.7; P, 12.1. Found (percent): C, 60.7; H, 4.9; Al, 2.6; Cl, 13.8; Ni, 5.7; P, 11.9.

The infrared spectrum of the crude product shows $\nu_{Ni-H}$ at 1950 cm.$^{-1}$ as a single absorption, but the recrystallized sample shows two bands at 1949 and 1916 cm.$^{-1}$. Solution infrared spectra in CHCl$_3$ and tetrahydrofuran shows only one weak, broad absorption at 1950 cm.$^{-1}$. The high field proton NMR spectrum of the recrystallized sample shows Ni-H at 22.95$\tau$ in tetrahydrofuran, 23.07$\tau$ in CD$_2$Cl$_2$, and 23.00$\tau$ in CH$_3$OH. The fine structure is resolved only in CH$_3$OH as a quintet with J$_{P-H}$=62 c.p.s.

Example XIII

A mixture of AgBF$_4$(0.5 g., 2.6 mmoles) and 20 ml. of 1,2-dimethoxyethane is degassed in a flask under vacuum. Anhydrous HCl (3.0 mmoles) is condensed into the flask and the mixture is stirred at 25° C. for 1 hour. The resulting solution of HBF$_4$ is filtered, to remove AgCl, directly into a solution of

[(C$_6$H$_5$)$_2$PCH$_2$CH$_2$P(C$_6$H$_5$)$_2$]$_2$Ni (1.95 g., 2.3 mmoles) in 50 ml. of 1,2-dimethoxyethane. The yellow solution rapidly turns orange, and an orange crystalline solid is precipitated. After stirring the mixture at 25° C. for 1 hour, the crude product is collected, extracted with a total of 800 ml. of hot tetrahydrofuran, and the filtered extract is concentrated to 100 ml. under vacuum. After storage at −20° C. for 65 hours, the solution is filtered, the orange crystalline solid is washed with tetrahydrofuran, and dried at 25° C. under 0.1 micron of Hg pressure for 16 hours to give 1.1 g. (51%) of [(C$_6$H$_5$)$_2$PCH$_2$CH$_2$P(C$_6$H$_5$)$_2$]$_2$NiH(BF$_4$), M.P. 190° C.

*Analysis.*—Calculated for C$_{52}$H$_{49}$BF$_4$NiP$_4$ (percent): C, 66.4; H, 5.1; F, 8.1; N, 6.2; P, 13.2. Found (percent): C, 65.9; H, 5.4; F, 7.7; Ni, 6.1 P, 13.9.

The infrared spectrum (Nujol mull) shows $\nu_{Ni-H}$ at 1950 cm.$^{-1}$ in addition to bands characteristic of BF$_4^-$ and (C$_6$H$_5$)$_2$PCH$_2$CH$_2$P(C$_6$H$_5$)$_2$; the proton NMR spectrum shows Ni-H at 23.01$\tau$ in CD$_2$Cl$_2$ solution; no fine structure is observed.

Example XIV

Anhydrous HCl (16.5 mmoles) is condensed into a degassed solution of [(C$_6$H$_5$)$_2$PCH$_2$CH$_2$P(C$_6$H$_5$)$_2$]$_2$Ni (5.0 g. mmoles) in 150 ml. of toluene. After being stirred at 25° C. for 3 hours the orange precipitate which has formed is collected, washed with toluene and dried at 25° C. under 0.5 micron Hg pressure for 16 hours to give 5.3 g. (96%) of orange

[(C$_6$H$_5$)$_2$PCH$_2$CH$_2$P(C$_6$H$_5$)$_2$]$_2$NiH(HCl$_2$)

M.P. darkens 145° C., decomposes 190° C.

*Analysis.*—Calculated for C$_{52}$H$_{50}$Cl$_2$NiP$_4$ (percent): C, 67.2; H, 5.4; Cl, 7.7; Ni, 6.3; P, 13.3. Found (percent): C, 66.7; H, 5.2; Cl, 8.2; Ni, 6.3; P, 13.3. Attempts to recrystallize this produce lead to decomposition.

The infrared spectrum (Nujol mull) shows $\nu_{Ni-H}$ at 1934 cm.$^{-1}$ in addition to bands characteristic of (C$_6$H$_5$)$_2$PCH$_2$CH$_2$P(C$_6$H$_5$)$_2$ In the proton NMR spectra of fresh CD$_2$Cl$_2$ solutions, the resonance observed at −3.22$\tau$ (area=1) is assigned to the HCl$_2^-$ anion while an unresolved Ni-H resonance appears at 23.02$\tau$ (area=1).

We claim:

1. A process of isomerizing 3-pentenenitrile to 4-pentenenitrile comprising contacting 3-pentenenitrile with a complex having the formula HNi(PYZ)$_n$$^+$X$^-$, wherein Z is selected from the class consisting of R and OR wherein R is selected from the class consisting of hydrocarbyl radicals of up to 18 carbon atoms and hydrocarbyl radicals of up to 18 carbon atoms and hydrocarbyl radicals of up to 18 carbon atoms substituted with groups selected from the class consisting of —Cl, —O—, and —CN, wherein Y is selected from the class consisting of two Z's and groups of the formula —R'— and —O—R'—O— wherein —R'— is a hydrocarbylene radical of from 2 to 12 carbon atoms, wherein $n$ is an integer of from 3 to 4, and $X^-$ is an anion of a protonic acid, at from —50 to 200° C. and forming 4-pentenenitrile.

2. The process of claim 1 wherein $X^-$ is selected from the class consisting of $HSO_4^-$, $Cl^-$, $Br^-$, $CN^-$, $CF_3COO^-$, $AlCl_4^-$, and $ZnCl_2CN^-$.

3. The process of claim 2 wherein Z is OR.

4. The process of claim 3 wherein R is alkyl.

5. The process of claim 4 wherein R is ethyl.

References Cited

UNITED STATES PATENTS 2,451,386  10/1948  Hager _____ 260—465.8

JOSEPH P. BRUST, Primary Examiner

U.S. Cl. X.R.

260—429.9, 439

PO-1050
(5/69)

UNITED STATES PATENT OFFICE
CERTIFICATE OF CORRECTION

Patent No. 3,538,142          Dated November 3, 1970

Inventor(s) William C. Drinkard, Jr. and Richard V. Lindsey, Jr

It is certified that error appears in the above-identified patent and that said Letters Patent are hereby corrected as shown below:

Column 1, line 44, "Reginal" should read "Reginald"

Column 2, line 9, "at" should be inserted after "reacted"

Column 2, line 64, delete duplicate "while rapidly stirring

Column 3, line 74, "HNi[P(OC$_2$H$_5$)$_3$]$_3$CH" should read "HNi[P(OC$_2$H$_5$)$_3$]$_3$CN"

Column 5, line 60, "stirrde" should read "stirred"

Column 6, line 55, "produce" should read "product"

Column 6, lines 70-71, delete "and hydrocarbyl radicals of up to 18 carbon atoms"

SIGNED AND
SEALED
MAR 2 1971

(SEAL)
Attest:

Edward M. Fletcher, Jr.
Attesting Officer

WILLIAM E. SCHUYLER, J
Commissioner of Patent